April 4, 1967 G. T. GILMORE 3,312,131
INSULATION FORMING DEVICE
Filed April 26, 1965 2 Sheets-Sheet 1

Guy T. Gilmore
INVENTOR.

BY Pamela O Wyatt

ATTORNEY

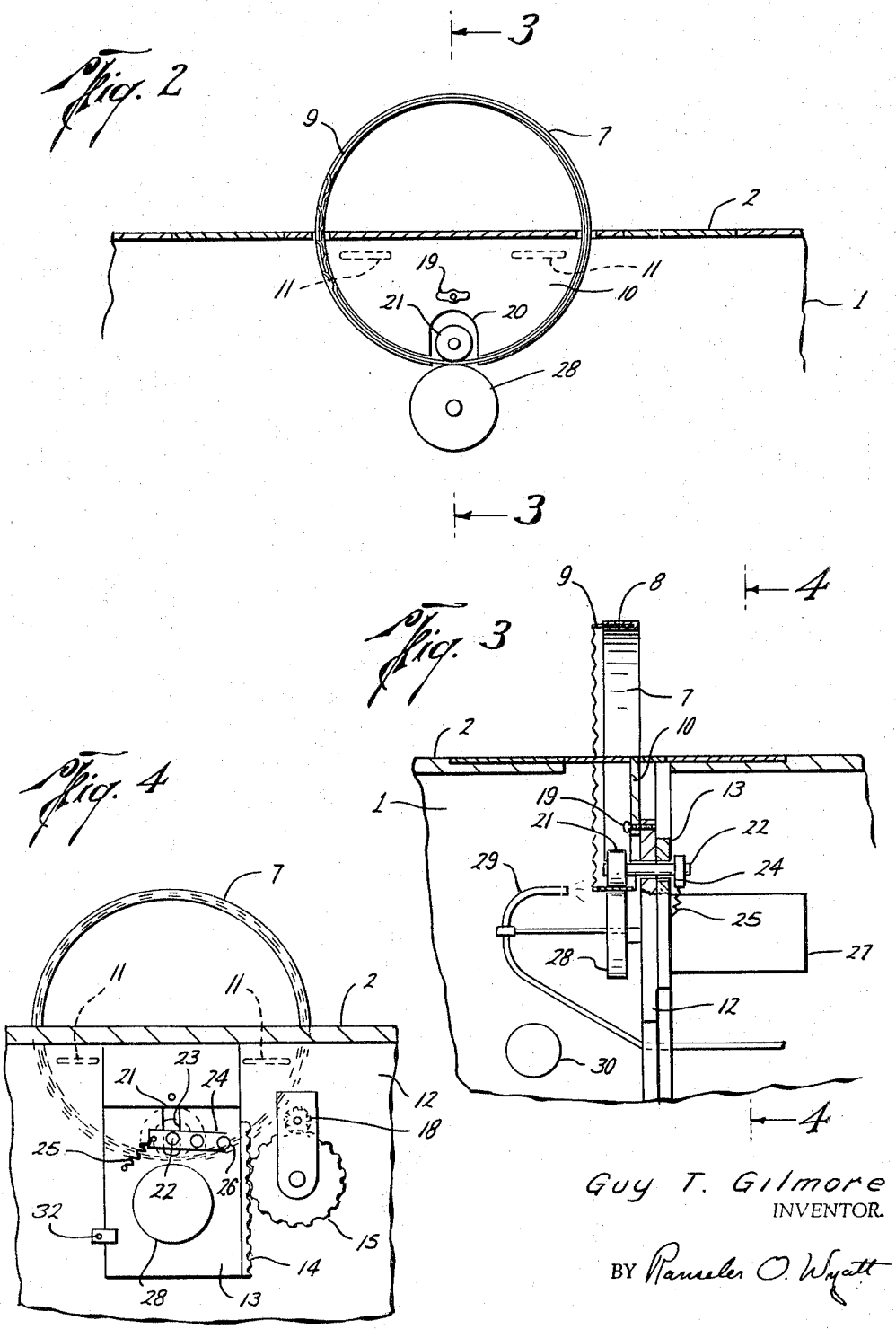

United States Patent Office 3,312,131
Patented Apr. 4, 1967

3,312,131
INSULATION FORMING DEVICE
Guy T. Gilmore, Houston, Tex.
(General Delivery, Agua Dulce, Tex. 78330)
Filed Apr. 26, 1965, Ser. No. 450,611
2 Claims. (Cl. 83—5)

This invention relates to new and useful improvements in insulation forming apparatus, and in the method of forming an article of manufacture.

It is an object of this invention to provide a device for forming insulation for conduits from suitable insulating material such as a block of calcium silicate, foamglass, polyurethane and the like.

It is another object of the invention to provide an insulator forming device having novel means for varying the size and shape of the insulators to be formed.

In employing many of the inert materials now available for insulation purposes, difficulty has been encountered in quickly and cheaply forming the conduit covers from the blocks of material, and in handling these formed insulators, due to the brittle nature of the material, causing frequent breakages. It is an object of this invention to provide a device that may be moved to the job site, as in refineries, and the like, where vast numbers of joints, elbows and the like are used, in addition to the usual straight pipe. Boxed blocks of the inert material to be used for insulation, which may be easily handled, are stacked near the apparatus and the various shapes of insulators quickly and easily formed by the machine and mounted on the conduit to be protected with a minimum of breakage.

It is another object of the invention to provide a machine for forming insulators, that may be quickly and easily adjusted to form the inner walls and the outer walls, respectively, of various sizes of pipe insulators, and the connections and joints, of various shapes, for conduit.

It is a still further object of the invention to provide an insulator forming device having novel means for quickly and easily changing the cutting means employed.

It is another object of the invention to provide a novel method of forming conduit insulators consisting of holding one corner of a block of material to be formed, and moving same in a predetermined path through a saw, as it pivots on the corner being held, forming the desired shape.

With the above and other objects in view, the invention has relation to certain novel features of construction, operation and arrangement of parts more particularly defined in the following specifications and illustrated in the accompanying drawings, wherein:

FIGURE 2 is a side elevational view of the cutter rotating mechanism.

FIGURE 3 is a cross sectional side view, in elevation, of the cutter mechanism, taken on the line 3—3 of FIGURE 2.

FIGURE 4 is a rear elevational view of the cutting mechanism taken on the line 4—4 of FIGURE 3.

Figure 1:
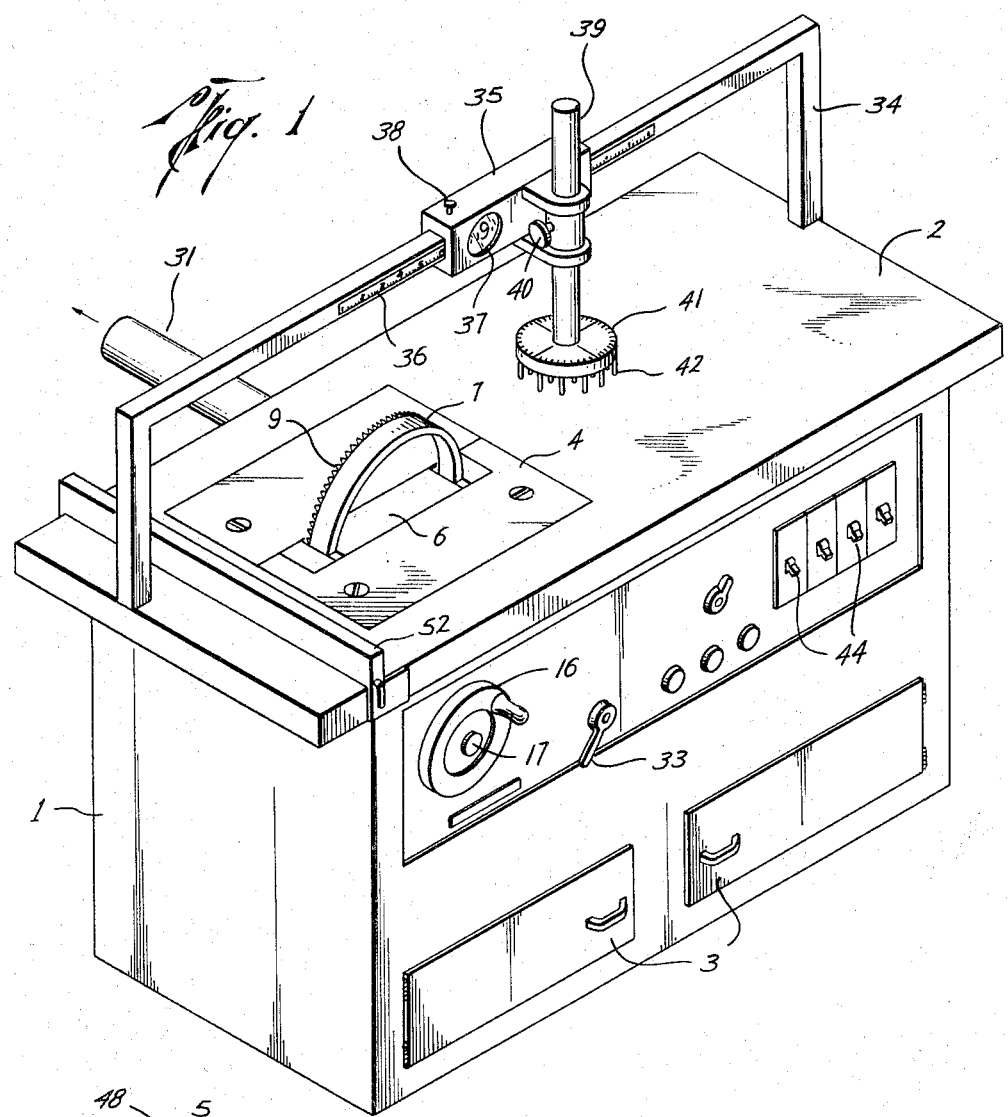
FIGURE 1 is a perspective front elevational view of the device.

Referring now more particularly to the drawing, the numeral 1 designates a bench in which the device is mounted, having a table top 2 and suitable spare part storage compartments 3, 3. A removable plate 4 is mounted in the top 2 and is provided with the cutting tool opening 5, and the caps 6 fitted into the opening 5, with spaces therebetween for the cutter blade holder 7. The cutter blade holder 7 is grooved, as 8, to receive the cutter blade 9 which rotates in the groove 8, and the lower half of the cutter blade holder is integral with the alignment plate 10, which has suitable keyways 11, 11 in which the conventional keys may be mounted to fit in keyways (not shown) in the vertical partition 12 of the bench 1 to fix the position of the blade at the proper horizontal plane with relation to the table top 2. Mounted on the partition 12 is the vertical adjustable drive support 13 having a rack 14 on one side margin which meshes with the gear 15 which in turn is rotated by the wheel 16 through the shaft and gear 17, 18 respectively, to move the support 13 vertically.

The plate 10 is maintained in position on the partition 12 by means of the wing bolt 19 and has an opening 20 in the lower portion thereof through which the pressure wheel 21 extends. The pressure wheel shaft 22, on which the pressure wheel 21 is mounted, extends through the partition 12 and through the vertical slot 23 in the support 13. A pivotal bar 24 is connected to the opposing end of the shaft 22 and suitable pressure means as the spring 25 maintains the desired pressure on the shaft 22. The bar 24 is a fulcrum with the pivot point between the respective ends thereof and the end opposite the spring 25 has a suitable handle 26, by means of which the pressure on the wheel 21 may be relieved.

A drive mechanism is mounted on the vertically adjustable support 13, which may consist of a conventional motor and gear box 27, which rotates the driven wheel 28. A jet nozzle 29 is mounted on the support 12 to be directed against the edge of the cutter 9 to keep the teeth of the cutter clean. A suitable compressor (not shown) maintains the desired amount of pressure on the jet and maintains a vacuum on the enclosed area of the bench 1 for discharge through the port 30 which discharges the cuttings through the conduit 31. A lock 32 is controlled by the bolt handle 33, releasably maintaining the support 13 in the desired position.

Mounted on the table top 2 is the pivot plate support, 34, which extends longitudinally over the table top 2 and on which is slidably mounted the pivot plate holder 35. The support 34 is calibrated with suitable indicia as at 36, and an opening 37 in the holder 35 provides a means of observing the calibrations 36 and setting the position of the holder 35 as desired. A lock 38 provides means for releasably securing the holder 35 in place. A pivot plate shaft 39 is vertically adjustable in the holder 35 and the lock 40 provides means for releasably anchoring the shaft 39 in the desired position. A pivot plate 41 is mounted on the lower end of the shaft 39 and is freely rotatable. The top surface of the plate 41 is calibrated in quadrants and graduations there-between. The bottom surface of the plate 41 has depending spikes 42.

The front panel of the bench is provided with a series of suitable control switches as 44.

Figure 5:
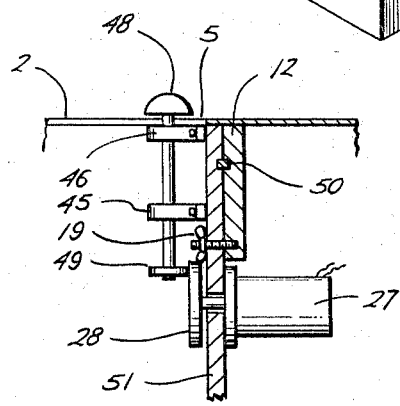
FIGURE 5 is a side elevational view, partially in cross section, of an alternate cutting mechanism.

An alternate cutter is shown in FIGURE 5 which is used when the inside walls to be formed in the insulator are of small diameter. This cutter is mounted on the partition 12 having suitable bearings 45, 46 mounted on the back plate 51, in which the shaft 47 rotates. A router cutter head 48 is mounted on the upper end of the shaft 47 and a driven wheel 49 is mounted on the lower end of the shaft 47 in contact with the side of the driving wheel 28. Keyways 50 and wing nut 19 align the back plate 51 in position on the partition 12 relative to the table top 2.

A fence 52, having suitable calibrations thereon, is mounted on the table top 2, adjacent the cutter. This fence is adjustable longitudinally of the table to vary the wall thickness as desired, or to move the fence out of the way entirely.

In operation, where a user seeks to form insulators for 90° elbows of three-inch pipe, for example, the insulators are formed in halves, so that they may be fitted on the pipe to be protected. The pivot plate holder 35 is released by rotating the lock 38 and the holder moved along the support 34 until the user can see the center mark in the opening 37 positioned on four and one half inches and the holder then locked in place. A block of material to be cut, such as "Foamglas" manufactured by Pittsburgh Corning, is placed on the table top with the right hand forward corner fitted to be covered by one ninety degree quadrant of the pivot plate, and the plate 41 then lowered into contact with the material, the spikes readily penetrating the block of material and thus firmly anchoring said material in position and the shaft 39 is locked in place. The cutter mounted on the partition 12 is of the diameter desired for forming the inside wall of the insulator. The jet is then activated by actuating the proper switch 44 and then the vacuum pump is started in the same manner, and then the motor 27 is started. As the cutter 9 rotates the block of material is pushed into the saw, pivoting with the pivot plate, and cutting the inside wall in the block at a ninety degree turn. The machine is then fully stopped and the cap 6 removed, the wing bolt 19 removed and the blade assembly removed by depressing the handle 26, relieving the pressure on the pressure wheel 21 and the blade assembly moved out of position. The support 13 is adjusted by rotating the wheel 16 and the new blade assembly placed in position, the keyway 11 providing means for accurate alignment of the cutter with the table top and the handle 26 depressed to permit insertion of the blade 9 between the wheels 28 and 21. The wheel 16 is rotated to move the drive wheel into place for this mounting and pressure again applied to the pressure wheel 21 to hold the blade surface firmly against the driven wheel by releasing the handle 26. Each cutter blade assembly will have an independent set of caps 6, which are placed in the cutter blade opening and the block of material, having the inner wall cut therein, is again placed on the top 2 and the pivot plate 41 moved into anchoring position as for the inner cut, and the block moved through the cutter in the same manner as in forming the inner wall, forming the outer wall of the insulator. In actual practice, it is determined how many of each size of insulators are desired, and then the necessary number of blocks are first passed through the device to form the inside wall of the insulator halves and the cutter blade assembly then changed and the blocks again passed through the blade to form the outer walls, thus retaining the rectangular block for pivot plate guidance until the last cut is formed.

As may be seen, any angle of cut may be accomplished as may be desired, including a full 180° turn, following the same rule as in the three inch L, using the formula of one and one-half times the diameter to obtain the radius.

Where a length of straight insulator is desired, the fence 52 will provide the desired wall thickness, and the insulator may be formed by moving the pivot plate and holder out of the way and cutting the outside wall first, then changing blades as hereinabove described, and forming the inside wall. The calibrations on the fence will permit forming the desired lengths of straight insulator and, with blocks of sufficient size, lengths of straight insulator joined on the L's may be accomplished.

In forming insulators for small size pipes, the router shown in FIGURE 5 is employed in lieu of a saw. Otherwise the operation is exactly the same. The inside cut being formed first in order to utilize the rectangular block to hold the material in the proper path of cut, and the adjustment of the pivot plate determining the angle of the cut.

While the foregoing is considered a preferred form of the invention, it is by way of illustration only, the broad principle of the invention being defined by the appended claims.

What I claim is:

1. In a device for forming insulators for pipe comprising a bench, a cutter blade of a pre-selected diameter rotatably mounted in said bench, a driven wheel in said bench movable into position to drive said cutter blade, means for yieldably maintaining pressure on said cutter blade and against said driven wheel, means for maintaining said cutter blade in position with relation to said bench to maintain one half of said blade above the bench top and means for directing an air jet against the cutter blade for cleaning and cooling said cutter blade as it rotates and a rotatable plate suspended above said blade movable into contact with a block of material and having quadrant guides for positioning a corner of said block of material and directing the path of said block of material through said cutter.

2. In a device for forming insulators for pipe comprising a bench, a cutter blade rotatably mounted in said bench, a driven wheel in said bench movable into position to drive said cutter blade, means for yieldably maintaining pressure on said cutter blade and against said driven wheel, means for maintaining said cutter blade in position with relation to said bench to maintain one half of said blade above the bench top and means for directing a jet of air beneath the top of said bench for removing cuttings from said cutter blade and from said bench, and means for engaging a corner of a block of material and directing the path of movement of material through said cutting blade.

References Cited by the Examiner

UNITED STATES PATENTS

| 2,375,231 | 5/1945 | Kottmann | 83—168 |
| 2,696,230 | 12/1954 | Libby | 143—171 |
| 2,751,941 | 6/1956 | Smith | 143—85 |
| 2,753,899 | 7/1956 | Murfin | 143—171 |
| 2,780,896 | 2/1957 | Jaye | 143—85 |
| 2,809,680 | 10/1957 | Nethery et al. | 143—85 |
| 2,841,193 | 7/1958 | Petrofsky | 143—171 |
| 2,898,955 | 8/1959 | Schwartz | 143—171 |
| 2,983,175 | 5/1961 | Harris | 83—635 |
| 3,060,779 | 10/1962 | Taft | 83—582 |
| 3,203,456 | 8/1965 | Witschnig | 143—85 |

ANDREW R. JUHASZ, *Primary Examiner.*

WILLIAM W. DYER, JR., L. B. TAYLOR,
*Assistant Examiners.*